United States Patent Office 3,300,438
Patented Jan. 24, 1967

3,300,438
POLYVINYL CHLORIDE PLASTICIZED WITH METHYL SUBSTITUTED BENZOPHENONE
Howard F. Reeves, Jr., Raymond W. Ingwalson, and Glendon D. Kyker, Chattanooga, Tenn., assignors, by mesne assignments, to Velsicol Chemical Corporation, a corporation of Tennessee
No Drawing. Filed June 27, 1963, Ser. No. 290,930
4 Claims. (Cl. 260—32.8)

This invention relates to plasticized compositions and is more particularly concerned with polyvinyl chloride plasticized with methyl substituted benzophenone.

In the past, pollyalkylated benzophenones have been used to plasticize vinyl resins. U.S. Patents No. 2,580,301 and 2,580,300 relate to such a product. The former patent teaches the use of a ketone containing an average of two nine-carbon aromatic groups for a plasticizer, the ketone being produced by the alkylation with phosgene of a petroleum hydrocarbon fraction.

Benzophenone itself is compatible with polyvinyl chloride and has plasticizing properties; however, benzophenone is a solid which melts at 49° C., has a very strong odor, and is more volatile than the plasticizers of the present invention. When in admixture with polyvinyl chloride above a 70 phr. level, the benzophenone tends to crystallize in the film.

It is an object of the present invention to provide a plasticized polyvinyl chloride composition which contains a plasticizer which solvates at a lower temperature than prior art compositions of the same general type as illustrated by gel temperature.

Another object of the present invention is to provide a plasticized polyvinyl chloride composition which is more efficient in that it has a higher percent elongation, a lower modulus and a lower hardness than prior art compositions of the same general type.

Another object of the present invention is to provide a plasticized polyvinyl chloride composition which is useful at a lower temperature than prior art compositions of the same general type.

Other objects, features and advantages of the present invention will become apparent from the following description of various embodiments of the present invention.

The plasticizers of the present invention may be generically represented by the following structural formulae:

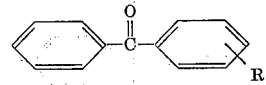

wherein R represents a methyl group ($CH_3$) substituted on one benzene ring and $x$ represents an integer from one through three, methyl substituted benzophenones, wherein $x$ represents more than three methyl groups substituted on one benzene ring, for example, tetramethylphenyl phenyl ketone and the heavier homologs, are generally unsuitable as plasticizers because they have a tendency to crystallize in the film at room temperature. It makes little difference on which positions the methyl substitution occurs, since the isomers are effective as plasticizers and do not usually require isolation.

The term methyl substituted benzophenone therefore means any one or a mixture of the following:

2-methyl benzophenone
3-methyl benzophenone
4-methyl benzophenone
2,3-dimethyl benzophenone
2,4-dimethyl benzophenone
2,5-dimethyl benzophenone
2,6-dimethyl benzophenone
3,4-dimethyl benzophenone
3,5-dimethyl benzophenone
Dimethylbenzophenone (mixed)
Trimethyl benzophenone (isomeric mixture)

The following Table I gives the physical characteristics of the methyl substiuted benzophenones of the present invention:

TABLE I.—MONO- AND DIMETHYLBENZOPHENONES—PHYSICAL PROPERTIES

| No. | Name | Structural Formula | Empirical Formula | Mol. Wt. | Boiling Range, ° C./mm. Hg |
|---|---|---|---|---|---|
| 1 | 2-methyl-benzophenone | | $C_{14}H_{12}O$ | 196.24 | |
| 2 | 3-methyl-benzophenone | | $C_{14}H_{12}O$ | 196.24 | |
| 3 | 4-methyl-benzophenone | | $C_{14}H_{12}O$ | 196.24 | |
| 4 | 4-methyl-benzophenone Concentrate. | | $C_{14}H_{12}O$ | 196.24 | 135–145/2 |
| 5 | 2,3-dimethyl-benzophenone | | $C_{15}H_{14}O$ | 210.26 | 152/2 |
| 6 | 2,4-dimethyl-benzophenone | | $C_{15}H_{14}O$ | 210.26 | 148–50/2 |

TABLE I.—MONO- AND DIMETHYLBENZOPHENONES—PHYSICAL PROPERTIES

| No. | Name | Structural Formula | Empirical Formula | Mol. Wt. | Boiling Range, °C./mm. Hg |
|---|---|---|---|---|---|
| 7 | 2,4-dimethyl-benzophenone Concentrate. | | $C_{15}H_{14}O$ | 210.26 | 311–314 |
| 8 | 2,5-dimethyl-benzophenone. | | $C_{15}H_{14}O$ | 210.26 | |
| 9 | 2,6-dimethyl-benzophenone. | | $C_{15}H_{14}O$ | 210.26 | 147/2 |
| 10 | 3,4-dimethyl-benzophenone. | | $C_{15}H_{14}O$ | 210.26 | 160–1/2.5 |
| 11 | 3,4-dimethyl-benzophenone Concentrate. | | $C_{15}H_{14}O$ | 210.26 | 150–5/1 |
| 12 | 3,5-dimethyl-benzophenone. | | $C_{15}H_{14}O$ | 210.26 | |
| 13 | Dimethyl-benzophenone (Mixed). | | $C_{15}H_{14}O$ | 210.26 | 130/1 |

| No. | Name | Specific Gravity at 25° C. | Refractive Index at 25° C. | Composition, Percent by Weight |
|---|---|---|---|---|
| 1 | 2-methylbenzophenone | | | |
| 2 | 3-methylbenzophenone | | | |
| 3 | 4-methylbenzophenone | | | |
| 4 | 4-methylbenzophenone Concentrate. | 1.0810 | 1.5978 | 4-methylbenzophenone, 77.8. 2-methylbenzophenone, 19–20.0. 3-methylbenzophenone, 2.5–3.0. |
| 5 | 2,3-dimethylbenzophenone | | 1.5914 | |
| 6 | 2,4-dimethylbenzophenone | ¹1.070 | 1.5898 | |
| 7 | 2,4-dimethylbenzophenone Concentrate. | 1.065 | 1.5885 | 2,4-dimethylbenzophenone, 93.0. 2,5-dimethylbenzophenone, 0.2. 2,6-dimethylbenzophenone, 6.0. 3,5-dimethylbenzophenone, 0.1. |
| 8 | 2,5-dimethylbenzophenone | 1.0616 | 1.5865 | 2,5-dimethylbenzophenone, 99+. 2,4-dimethylbenzophenone, about 1. |
| 9 | 2,6-dimethylbenzophenone | | | |
| 10 | 3,4-dimethylbenzophenone | | 1.5996 | |
| 11 | 3,4-dimethylbenzophenone | 1.0728 | 1.5988 | 2,3-dimethylbenzophenone, 12.0. 2,4-dimethylbenzophenone, 4.0. 2,5-dimethylbenzophenone. 3,4-dimethylbenzophenone, 84.0. |
| 12 | 3,5-dimethylbenzophenone | | | |
| 13 | Dimethylbenzophenone (Mixed) | 1.0642 | 1.5892 | 2,4-dimethylbenzophenone, 67. 2,5-dimethylbenzophenone, 28. 2,6-dimethylbenzophenone, 3.5. Ethyl benzene, 0.7. |

We have found that the plasticizers of the present invention when in admixture with polyvinyl chloride are more effective as a plasticizer than either benzophenone or the polyalkylated benzophenone such as those disclosed in U.S. Patents Nos. 2,580,300 and 2,580,301.

It is well known that plasticizers impart flexibility, stretch and other properties to a plastic in which they are incorporated. The ratio of most plasticizers to resin may be varied to impart various characteristics which the resin alone does not have. In the present invention, the ratio of plasticizer to resin, i.e., the methyl substituted benzophenone to polyvinyl chloride, may vary up to three parts by weight plasticizer to two parts by weight resin; however, the preferred range for most purposes is from 1:2 to 1:1 plasticizer to resin. The compounds of the present invention may be employed as the sole plasticizer or they may be blended with other plasticizers, depending, of course, upon the particular properties to be imparted to the final product. They are useful in combination with other plasticizers as, for example, dioctyl phthalate, didecyl phthalate, dipropylene glycol dibenzoate, hydrocarbon plasticizers, benzyl butyl phthalate, etc., and they transmit their desirable properties to mixed plasticizer systems for PVC.

PREPARATION OF THE PLASTICIZER

Many methods may be employed for preparing the methyl substituted benzophenones of the present invention. For example, they may be prepared by reacting methyl substituted aromatic hydrocarbon with benzotrichloride followed by hydrolysis of the resulting substituted dichloromethane. A second method may include the reaction of benzoyl chloride with methyl substituted aromatic hydrocarbon in the presence of anhydrous metallic chloride catalysts such as aluminum chloride or ferric chloride. A third method of producing the methyl substituted benzophenone may include the condensing of benzoic acid or benzoic anhydride with a methyl substituted aromatic hydrocarbon in the presence of hydrogen fluoride as a condensing agent.

Compounds of the present invention may also be produced by refluxing benzoyl chloride with a molar excess of toluene, xylene or trimethyl benzene in the presence of anhydrous ferric chloride, as a catalyst, followed by washing the condensation product in water. Thereafter, the excess of toluene, xylene or trimethyl benzene may be removed by distillation followed by distillation of the methyl substituted ketone condensation product at reduced pressures.

Other methods of producing the methyl substituted benzophenones are disclosed in the following references:

| Reference: | Product produced |
|---|---|
| Journal Organic Chemistry 4, 1–13, 1939 | O-ethyl benzophenone. |
| Journal American Chemical Society 61, 1795–6, 1939 | P-methyl benzophenone. |
| Journal American Chemical Society 82, 1223–6, 1960 | 4 methyl benzophenone. |
| Organic Chloride Compounds by E. H. Huntress, John Wiley & Sons, Inc., p. 829 | Products from the reaction of benzoyl chloride with aromatic hydrocarbons. |
| Anhydrous Aluminum Chloride in Organic Chemistry by C. A. Thomas, Reinhold Publishing Corp., p. 224 | 2,4,-6-trimethyl benzophenone. |
| Doklady Akad Nauk Uzbek U.S.S.R. 1959 No. 4, 36–39 | 2,4 dimethyl benzophenone. |

A specific example of producing dimethyl benzophenone is given in the following example.

Example I

To a round bottom flask equipped with a reflux condenser, an addition funnel, a heating mantle, a thermometer and a stirrer was charged:

954 grams (9 moles) of mixed xylenes (analysis by gas chromatograph=1% ethyl benzene, 27.9% para xylene, 70.8% meta xylene and 0.3% ortho xylene).

30 grams of anhydrous ferric chloride ($FeCl_3$).

To the top of the condenser was added an HCl absorber for basorbing the HCl in water, the HCl absorber having a device for weighing the HCl.

Next, 843 grams (6 moles) of benzoyl chloride was placed in the addition funnel for subsequent addition to the mixture in the flask. The mixture in the flask was stirred and heated until the temperature of the mixture reached 140° C., at which time the benzoyl chloride was slowly added to the mixture. The evolution of hydrogen chloride (HCl) began immediately. The rate of addition of the benzoyl chloride to the mixture in the flask was such that 1.66 hours was required to complete the addition. During that period, the temperature of the mixture was maintained between 132° C. and 147° C. and 69% of the theoretical hydrogen chloride was evolved.

The mixture in the flask was heated to a temperature of between 147° C. and 150° C. for a period of three hours which resulted in completing the reaction with the evolution of the remaining 31% of the theoretical hydrogen chloride.

The reacted material was then cooled in the flask to a temperature between 95° C. and 100° C. and thereafter a wash solution of 250 ml. of 20% aqueous sodium chloride was added to the flask as the reacted material was agitated. The wash solution was removed and washing was repeated three times at a temperature of 95° C. to 100° C. using a slightly acidic brine solution. The reacted material was then given a wash with 250 ml. of 20% sodium carbonate solution ($Na_2CO_3$) and a final wash with the 20% brine solution.

The product, at this time, weighed 1520 grams and was charged into a still fitted with a one-foot packed column and a 2:1 reflux ratio control. Upon operation of the still, 252.5 grams of xylenes were removed at 70° C. to 75° C./80 mm. Hg. Thereafter, 1181 grams of dimethyl benzophenone were removed at 135° C. to 140° C./2 mm. Hg.

The yield of dimethyl benzophenone was 93.6% of theoretical based upon the amount of benzoyl chloride initially charged into the flask and 90% of theoretical based upon the amount of xylenes consumed.

The following example depicts a method of preparing methyl benzophenone.

Example II

The flask described in Example I was employed using 92.13 grams (1 mole) of toluene and 133.34 grams (1 mole) of aluminum chloride as a flask charge, together with nitrobenzene as a solvent. To the flask charge was slowly added 140.57 grams of benzoyl chloride. The flask was maintained at 25° C. for approximately 5 hours.

The isometric mixture of methyl benzophenone was recovered from the above described reactants by fractional distillation.

Yields in the range of 85% to 95% were obtained.

When it is desired to produce compounds of the present invention which are high in one particular isomer or the other, a particular isomer of xylene may be used to produce a corresponding isomer of methyl substituted benzophenone by the reaction of benzoyl chloride therewith, as described above.

The following Table II shows the characteristics of dimethyl benzophenones produced from relatively pure isomers of xylene as well as from a mixture of isomers thereof.

TABLE II.—DIMETHYL BENZOPHENONES PREPARED FROM MIXED OR RELATIVELY PURE ISOMERS AS SHOWN

| | Xylene Used | | | |
|---|---|---|---|---|
| | Relatively pure ortho | Relatively pure meta | Relatively pure para | Mixed Xylene [1] |
| Specific gravity at 25° C | 1.0728 | 1.065 | 1.0616 | 1.0640 |
| Refractive Index, $N_D{}^{25}$ | 1.5988 | 1.5985 | 1.5865 | 1.5870 |
| Boiling range, ° C./mm. Hg | 150–5/1 | 142–50/2 | 138–43/1 | 140–2/2 |
| Isomer Distribution (approx.), percent: | | | | |
| 2,4-dimethyl | 4 | 93 | <1 | 67 |
| 2,5-dimethyl | Trace | <1 | 99 | 28 |
| 2,6-dimethyl | | 6 | | 4 |
| 3,4-dimethyl | 84 | <1 | | <1 |
| 2,3-dimethyl | 12 | | | |
| Ethyl benzophenone isomers | | | | <1 |

[1] Composition—Meta xylene, 70.8%; para xylene, 27.9%; ortho xylene, 0.3%; ethyl benzene, 1.0%.

When the methyl substituted benzophenone was produced utilizing toluene, the methyl substituted benzophenone had the characteristics described in Table III:

TABLE III.—METHYL BENZOPHENONE (MIXED ISOMERS)

| | |
|---|---|
| Specific gravity @ 25° C. | 1.0810 |
| Refractive index $N_D^{25}$ | 1.5978 |
| Boiling range ° C./mm. Hg | 135–45/2 |
| 4-methylphenyl phenyl (approximately) percent | 78 |
| 2-methyl and 3-methylphenyl phenyl (approximately) do | 22 |

When the methyl substituted benzophenones were produced utilizing a petroleum hydrocarbon fraction which had a boiling range of from 318° F. to 353° F., by reaction with benzoyl chloride, the petroleum hydrocarbon containing $C_9$ aromatics (mixed isomers of trimethylbenzene), the resulting methyl substituted benzophenone had the following properties described in Table IV.

TABLE IV.—TRIMETHYLPHENYL PHENYL KETONE

| | |
|---|---|
| Specific gravity @ 25° C. | 1.0511 |
| Boiling range ° C./mm. Hg | 145–55/1 |
| Average molecular weight | 223.8 |

PLASTICIZED COMPOSITIONS

To test the properties of the plasticized compositions, the plasticizers of Tables II, III and IV were respectively mixed according to Example III with Geon 121 (a commercial polyvinyl chloride produced by B. F. Goodrich) and test samples were prepared therefrom.

*Example III*

The plasticizer being tested was compounded at 70 phr. plasticizer level with 3 phr. Mark M stabilizer (a barium-cadmium stabilizer produced by Argus Chemical Company). The resin (polyvinyl chloride) was added to the plasticizer-stabilizer mix and stirred for fifteen minutes in a blender. The plastisol thus produced was then deaerated in a vacuum desiccator until all foaming had stopped. A sheet was then produced by pouring a layer of plastisol forty-five mils thick onto a glass plate and by placing it in an oven, heated to 350° F., for a period of fifteen minutes. The plate was then removed from the oven, the sheet removed from the plate and the sheet cut into samples which were subjected to various tests, including tensile, elongation, 100% modulus, hardness and low temperature flexibility. Table V discloses the results of the tests.

*Example IV*

The plastisol produced according to Example III was subjected to gel tests using the following procedure: a sheet of stainless steel plate was heated on only one end with a chromalox bar to produce a temperature gradient from the heated end to the nonheated end. A strip of plastisol about one inch wide and ten mils thick was poured from one end of the plate to the other and allowed to stand for two minutes. The strip of plastisol was then examined to determine the exact spot on the plate at which there was a demarcation between the gelled and ungelled plastisol. The temperature of the spot at which the demarcation occurred was taken with a pyrometer and recorded as the gel temperature of the plastisol. The results of this example are recorded in Table V.

*Example V*

To compare the quality of the plasticized composition produced according to the present invention with the plasticized composition produced utilizing diaryl ketone having 19 carbons as the plasticizer, the following experiment was conducted. Diaryl ketone was produced according to U.S. Patent No. 2,580,300 and then the procedure of Example III was repeated using the 19 carbon diaryl ketone as plasticizer for the plastisol. Also, the plastisol was tested for gel temperature according to Example IV. The results of this example are given in Table V hereof.

From the following Table V, it will be seen that utilizing the plasticizer of the present invention an improved 100% modulus and lower Shore A hardness was imparted to the polyvinyl chloride. The lower gel temperature of the polyvinyl chloride plasticized with methyl substi-

TABLE V

| Ketone | Methyl Benzophenone Mixed Isomers | Dimethyl Benzophenone from relatively pure m-xylene | Dimethyl Benzophenone from relatively pure o-xylene | Dimethyl Benzophenone from relatively pure p-xylene | Dimethyl Benzophenone from mixed xylene | Trimethyl phenyl phenyl from $C_9$ average aromatic hydrocarbon | Example V Control |
|---|---|---|---|---|---|---|---|
| Formulation: | | | | | | | |
| Geon 121, parts | 100 | 100 | 100 | 100 | 100 | 100 | 100 |
| Plasticizer, parts | 70 | 70 | 70 | 70 | 70 | 70 | 70 |
| Mark M, parts | 3 | 3 | 3 | 3 | 3 | 3 | 3 |
| Fused—15 min. at 350° F.: | | | | | | | |
| Tensile, p.s.i. | 1,547 | 1,701 | 1,493 | 1,738 | 1,770 | 2,106 | 2,879 |
| Elongation, Percent | 432 | 372 | 350 | 368 | 374 | 352 | 302 |
| Modulus, 100% p.s.i. | 453 | 518 | 504 | 511 | 559 | 642 | 1,473 |
| Hardness, Shore A | 56 | 57 | 55 | 57 | 58 | 60 | 73 |
| Gel Temperature, ° C | 52 | 51 | | 49 | 51 | 57 | 70 |
| Low Temp. Flex.,° C | (−)20.5 | (−)19.0 | (−)14.0 | (−)19.3 | (−)18.3 | (−)11.8 | +7.2 | tuted benzophenones according to the present invention indicates the ability of the methyl substituted benzophenones to solvate vinyl resins at temperatures lower than conventional ester type plasticizers and give such plasticizers special utility in coating and adhesive applications when it is desirable to obtain a fast rate of solvation of vinyl resin and to avoid overheating the materials being bonded or coated.

It will be understood by those skilled in the art that various methods of compounding the polyvinyl chloride and methyl substituted benzophenone are available. Example VI below illustrates a milling procedure for compounding:

*Example VI*

The following ingredients were dry blended together:

| | Grams |
|---|---|
| Polyvinyl chloride resin (Marvinol VR–23 [1]) | 200 |
| Plasticizer (mixed isomers of dimethyl benzophenone | 100 |
| Ba-Cd-Zn stabilizer | 5 |
| Stearic acid | 1 |

[1] Manufactured by Naugatuck Chemical Division of U.S. Rubber Co.

The blend was introduced into a double roll mill and milled for five minutes at a roll temperature of 270° F. Next, sheets were prepared from the milled material by molding the material at 325° F. for five minutes using a pressure on the material of 280 p.s.i. followed by increasing the pressure on the material to 1700 p.s.i. for an additional 2½ minutes. The sheets were then cooled while still under the molding pressure.

For obtaining physical characteristics, dumbbell specimens (ASTM die "C") were cut from the sheets and aged forty hours at 24° C. prior to testing. The test results were as follows:

Tensile strength [2] _____ p.s.i.__ 2770
100% modulus [2] _____ p.s.i.__ 1530
Elongation [2] _____ percent__ 245
Hardness (Shore A) _____ 73

[2] Run on a Scott L-6 Tensile Tester.

With respect to conventional ester type plasticizers, the plasticized compositions of the present invention are more resistant to the action of alkalies and acids than comparable resins plasticized with such conventional plasticizers.

By the term polyvinyl chloride as used herein, it will be understood that this term also includes copolymers of polyvinyl chloride such as vinyl chloride-vinyl acetate copolymer and vinyl chloride vinyl cyanide copolymer.

It will be obvious to those skilled in the art that many variations may be made in the embodiments chosen for the purpose of illustrating the present invention without departing from the scope thereof as defined by the appended claims.

We claim:

1. A plasticized composition comprising polyvinyl chloride resin plasticized with methyl substituted benzophenone wherein the substitution is on a single benzene ring thereof, said substituted benzophenone containing from one to three methyl groups.

2. A plasticized composition comprising polyvinyl chloride resin plasticized with a methyl substituted benzophenone having the structure formula:

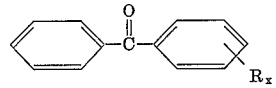

wherein R represents a methyl group or groups and $x$ represents an integer of from one through three.

3. The composition defined in claim 2 wherein the ratio by weight of plasticizer to resin is from 1:2 to 3:2.

4. A plasticized composition comprising polyvinyl chloride resin plasticized with isometric mixtures of methyl substituted benzophenone selected from the group consisting of: 2-methyl benzophenone, 3-methyl benzophenone, 4-methyl benzophenone, 2,4-dimethyl benzophenone, 2,5-dimethyl benzophenone, 2,6-dimethyl benzophenone, 3,4-dimethyl benzophenone, 2,3-dimethyl benzophenone, 3,5-dimethyl benzophenone, trimethyl benzophenone, and mixtures thereof.

References Cited by the Examiner

UNITED STATES PATENTS

| | | | |
|---|---|---|---|
| 2,538,254 | 1/1951 | Lee et al. | 260—32.8 |
| 2,580,300 | 12/1951 | Johnson et al. | 260—32.8 |
| 2,580,301 | 12/1951 | Johnson et al. | 260—32.8 |
| 2,646,663 | 7/1953 | Newton | 260—591 |

MORRIS LIEBMAN, *Primary Examiner.*

J. W. BEHRINGER, J. H. DERRINGTON,
*Assistant Examiners.*

UNITED STATES PATENT OFFICE
CERTIFICATE OF CORRECTION

Patent No. 3,300,438                                              January 24, 1967

Howard F. Reeves, Jr., et al.

It is hereby certified that error appears in the above numbered patent requiring correction and that the said Letters Patent should read as corrected below.

Columns 3 and 4, below the second part of TABLE I, insert as a footnote -- $^1$At 20°. --; column 10, line 13, for "isometric" read -- isomeric --.

Signed and sealed this 14th day of November 1967.

(SEAL)
Attest:

Edward M. Fletcher, Jr.                                    EDWARD J. BRENNER

Attesting Officer                                             Commissioner of Patents